Dec. 19, 1950     M. LANG     2,534,357
MEAT-TENDERIZING MACHINE
Filed Aug. 9, 1946     2 Sheets-Sheet 1
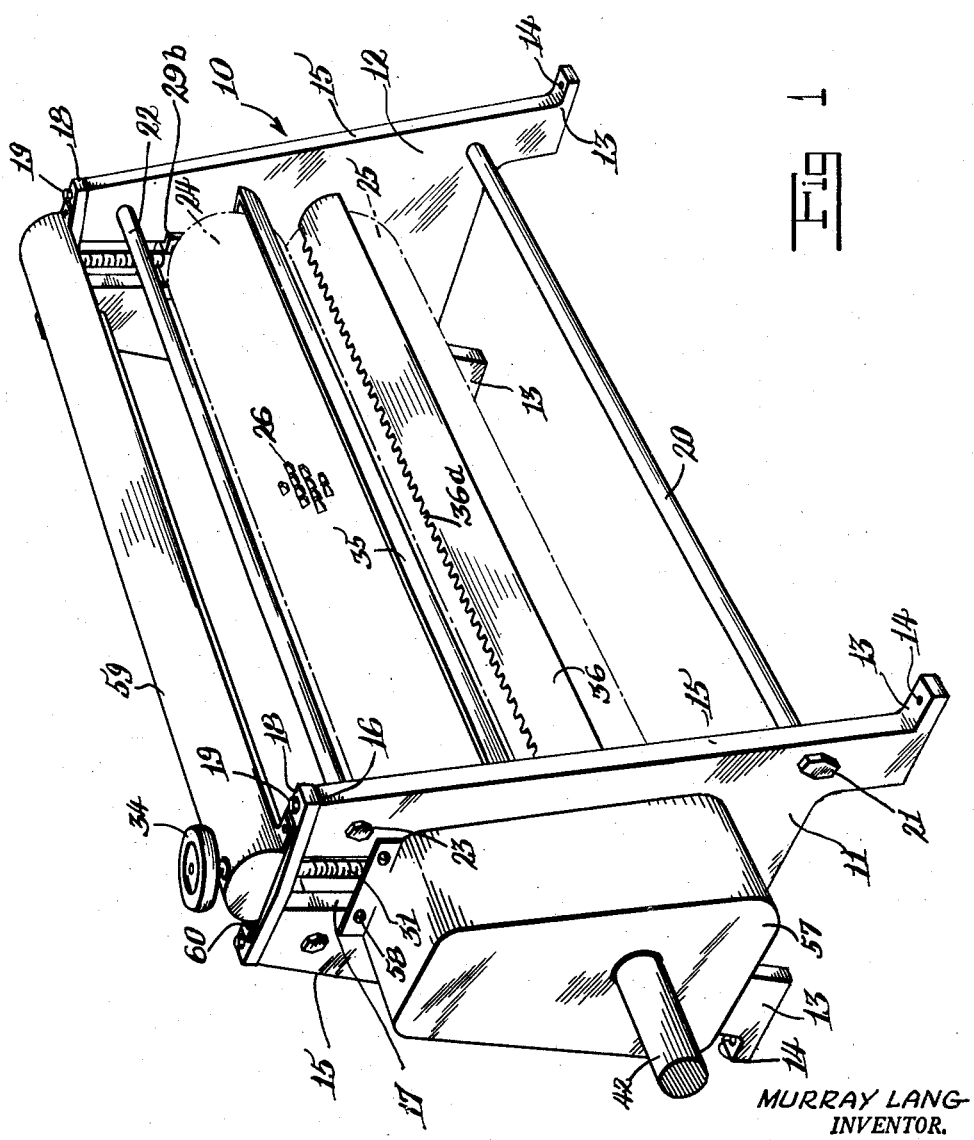
MURRAY LANG
INVENTOR.
BY
ATTORNEY

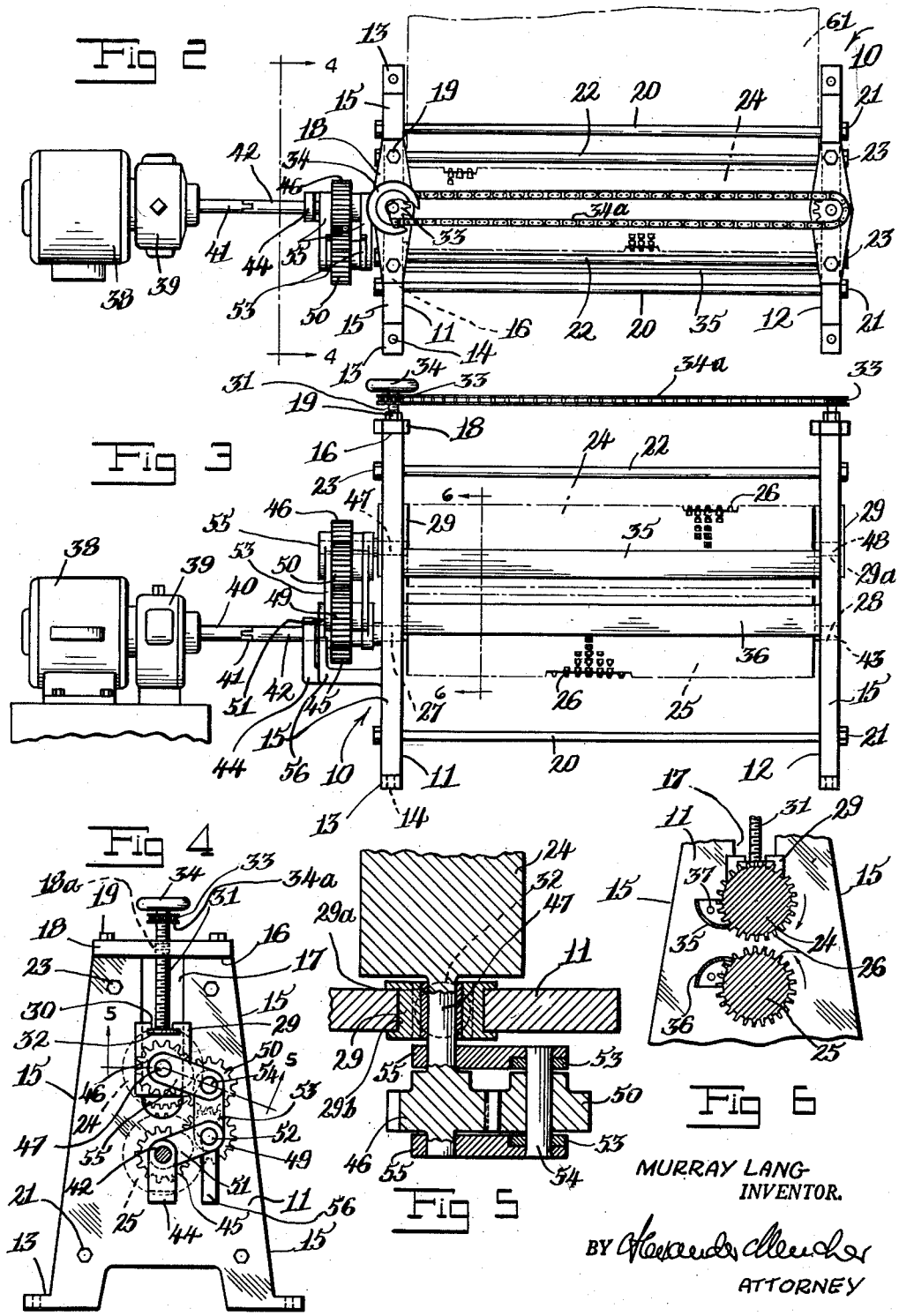

Patented Dec. 19, 1950

2,534,357

UNITED STATES PATENT OFFICE 2,534,357

MEAT-TENDERIZING MACHINE

Murray Lang, New York, N. Y.

Application August 9, 1946, Serial No. 689,543

4 Claims. (Cl. 17—26)

1

This invention relates generally to a machine for tenderizing cuts of meats, but more specifically to a machine having a pair of adjustably spaced and oppositely rotating toothed rollers adapted to drive cuts of meat therebetween.

The main object of the invention resides in the provision of a machine for tenderizing cuts of animal tissue such as meats thereby rendering thick and tough cuts into thin and tender slices which are preferable for quick and easy cooking and for agreeable taste and easy mastication.

A further object of the invention resides in the provision of such a device having oppositely rotating rollers provided with juxtaposed teeth of such design and shape as to quickly and efficiently sever the surface fibres of the meat cuts thereby rendering them more tender, thinner and at the same time retaining the integration of each.

A further object of the invention resides in the provision of a device having a pair of power-driven and adjustably spaced toothed rollers for tenderizing and controlling the thickness of meat cuts such as steaks, veal cutlets and the like passing therethrough.

Another object of the invention resides in the provision of a meat tenderizer which is simple in construction, efficient and economical in operation and which is sanitary and capable of tenderizing a large quantity of meat cuts in a short interval of time.

These objects and other incidental ends and advantages of the invention will hereinafter appear in the progress of the disclosure and as pointed out in the appended claims.

Accompanying this specification are drawings showing a preferred form of the invention wherein corresponding reference characters designate corresponding parts throughout the several views and wherein:

Figure 1 is a view in perspective of the meat tenderizer with the prime mover omitted and the transmission means concealed.

Figure 2 is a top plan view partly broken away of the device with the cover members removed and showing a feeding platform in phantom.

Figure 3 is a front view in elevation of the device shown in Figure 2.

Figure 4 is a side view in elevation taken along the plane 4—4 of Figure 2.

Figure 5 is an enlarged fragmentary sectional view taken along the broken plain 5—5 of Figure 4.

Figure 6 is a fragmentary sectional view taken along the plane 6—6 of Figure 3.

In accordance with the invention and the

2 preferred form shown the device generally indicated by numeral 10 is comprised of two spaced and end upright supports 11 and 12 having spaced foot members 13 for attachment to any convenient base by the fixing of fastening elements thereto through the apertures 14. Each of the uprights 11 and 12 as shown is provided with tapering side walls 15 which terminate in a flat top wall 16 from which proceeds downwardly a central and vertically disposed U-shaped notch 17. To close the notch 17 in each of the uprights 11 and 12 and to serve as a support for raising and lowering an upper roller 24 as will hereinafter appear is a top cross member 18 which is secured to the flat top wall 16 of each of the uprights by suitable means such as bolts 19.

To reinforce the upright supports 11 and 12 a pair of spaced tie rods 20 are provided adjacent the bottom of uprights 11 and 12 secured by nuts 21 while similar and more closely spaced tie rods 22 are provided adjacent the top of uprights 11 and 12 and are similarly secured as by nuts 23.

Interposed and mounted between the uprights 11 and 12 are a pair of vertically spaced toothed rollers 24 and 25 each provided with peripheral teeth 26 in the form of truncated cones or pyramids the said teeth being adjustably spaced from each other and opposed to each other. The upper roller 24 is adapted for vertical adjustment while the lower roller 25 is adapted to be mounted for rotation between aligned openings 27 and 28 in the uprights 11 and 12.

The upper roller 24 is adapted to be mounted in a pair of slidable members each designated by numeral 29 and each slidably engaging the walls of slot 17 by means of U-shaped side walls 29b as best shown in Figure 5. Rising upwardly from each of the members 29 and suitably secured thereto as by an upper notch 30 is a threaded shaft 31 having a securing disk 32 at the bottom to engage notch 30. Each of the shafts 31 terminates at the top in a gear wheel 33 both of the said gear wheels being connected by means of a sprocket chain 34a as best seen in Figure 2. It is thus seen that by manipulating a handle 34 which projects above one of the gear wheels 33 the other shaft is similarly affected and by virtue of the threaded engagement between each of the shafts 31 and the threaded opening 18a in each of the top cross pieces 18 a raising or lowering of the upper roller 24 will be effected through the movement of the members 29 within the slots 17 in uprights 11 and 12 as will more fully appear.

It is to be observed that the sprocket chain 34a causes the gear wheels 33 to rotate at an equal rate and to maintain the spacing between rollers 24 and 25 in proper alignment and also to serve as a locking device to prevent relative movement between bearings 29 and 29a.

To prevent the meat cut from becoming enmeshed in either of the rollers 24 or 25 there are provided a pair of longitudinal guards 35 and 36 mounted between uprights 11 and 12 at the rear of rollers 24 and 25 each of the guards having notches as at 36a to receive the teeth 26 of each of the rollers. The guards as shown are fastened to the inner walls of the uprights 11 and 12 by means of screws 37 penetrating the end walls of the guards.

To drive the toothed rollers 24 and 25 a prime mover such as an electric motor 33 is provided which engages a gear reduction mechanism 39. A shaft 40 secured to the gear reduction mechanism 39 is coupled at 41 with the power intake shaft 42 which proceeds through the opening 27 in upright 11 from the lower and stationary roller 25. The opposite end of the roller 25 is provided with a stub shaft 43 rotating in the opening 28 of upright 12. A bracket 44 is secured to the outer wall of upright 11 and is adapted to support shaft 42, the said shaft beyond upright 11 and inside bracket 44 being provided with a driving gear 45 which is adapted to cause opposite rotation of a driven gear 46 on one of the stub shafts 47 of top roller 24. The stub shaft 47 penetrates central bearing 29a in the sliding member 29 in one of the uprights such as 11, the opposite end of roller 24 having a stub shaft 48 mounted in a similar sliding member 29 in upright 12.

Since roller 24 is adjustably spaced from the stationary roller 25, a pair of idler gears 49 and 50 are provided between driving gear 45 and driven gear 46. For this purpose a link 51 on shaft 42 and on each side of driving gear 45 proceeds to each side of stub shaft 52 carrying idler 49. A second link 53 proceeds from each side of stub shaft 52 and proceeds to a stub shaft 54 on each side of idler 50; and a third link 55 proceeds from each side of stub shaft 54 to each side of stub shaft 47 carrying the driven gear 46. In this manner any adjustment of roller 24 by movement of handle 34 results in the driving of gear 46 from the driving gear 45 through the links 51, 53 and 55 and the idlers 49 and 50.

In order to serve as a stop for the lowest position of link 51 a bracket 56 secured to upright 11 is provided all as best shown in Figure 4. The transmission means between driving gear 45 and driven gear 46 may be concealed by a cover 57 secured to the wall of upright 11 as by screws 58, while a cover 59 may be provided to guard sprocket chain 34 secured to the top cross members 18 as by screws 60. Moreover, the meat cuts adapted to be thinned and tenderized are fed between rollers 24 and 25 in a frozen condition to expedite thinning and proper tenderizing, the said feeding being done by means of a stationary or movable platform 61 as shown in phantom in Figure 2.

The device is capable of being usable either for cuts of fresh meat or meat that has been frozen at about −40° F. The cuts after passing through the device are not macerated nor shredded and the surface presents a waffle-like design. An important feature resides in the adjustability of the distances between the ends of the teeth 26 on the rollers 24 and 25 to control the thickness of the meat and the degree of tenderizing thereof.

I wish it understood that minor changes and variations in the number, size, shape, location, material and integration of the parts of invention may all be resorted to without departing from the spirit of the invention and the scope of the appended claims.

I claim:

1. In a meat tenderizing machine, end supporting uprights, a stationary crushing roller journalled in the uprights and having peripheral teeth, an adjustable crushing roller cooperating with the stationary roller and having oppositely disposed peripheral teeth to compress the meat cut passing therebetween, a shaft to drive the stationary roller, slidable journalling means for the adjustable roller mounted in the uprights, extendible transmission means between the shaft and the movable roller to cause opposite rotation thereof, and a locking device connected to said slidable journalling means and supported by the uprights to fix the position of said journalling means with respect to each other in adjusted position.

2. In a meat tenderizing machine, end supporting uprights, a stationary crushing roller journalled in the uprights and having peripheral teeth, an adjustable crushing roller cooperating with the stationary roller and having oppositely disposed peripheral teeth to compress the meat cut passing therebetween, a shaft to drive the stationary roller, slidable journalling means for the adjustable roller mounted in the uprights, extendible transmission means between the shaft and the movable roller to cause opposite rotation thereof, a locking device connected to said slidable journalling means and supported by the uprights to fix the position of said journalling means with respect to each other in adjusted position, a guard at the rear of each roller and being secured to the uprights and having serrations to receive the roller teeth and prevent the meat from winding on the rear of either roller, and a platform between the uprights and disposed in front of the rollers for feeding meat cuts therethrough.

3. In a meat tenderizing machine, end supporting uprights, a stationary crushing roller journalled in the uprights and having peripheral teeth, an adjustable crushing roller cooperating with the stationary roller and having oppositely disposed peripheral teeth to compress the meat cut passing therebetween, a shaft to drive the stationary roller, slidable journalling means for the adjustable roller mounted in the uprights, extendible transmission means between the shaft and the movable roller to cause opposite rotation thereof, a locking device connected to said slidable journalling means and supported by the uprights to fix the position of said journalling means with respect to each other in adjusted position, said extendible transmission means comprising a gear on said drive shaft, a gear on said adjustable roller, a linkage extending between the drive shaft and the roller and cooperating gears carried by the linkage movable therewith, said cooperating gears drivingly connected with the gears on the drive shaft and the adjustable roller.

4. In a meat tenderizing machine, end supporting uprights, a stationary crushing roller journalled in the uprights and having peripheral teeth, an adjustable crushing roller cooperating with the stationary roller and having oppositely disposed peripheral teeth to compress the meat cut passing therebetween, a shaft to drive the stationary roller, slidable journalling means for the adjustable roller mounted in the uprights, extendible transmission means between the shaft and the movable roller to cause opposite rotation thereof, and a locking device connected to said slidable journalling means and supported by the uprights to fix the position of said journalling means with respect to each other in adjusted position, said journalling means comprising slides adjustable on the upright support, said locking device comprising threaded shafts connected respectively with the slides to move the same, each threaded shaft having a sprocket thereon, a sprocket chain interconnecting said sprockets, and an adjusting handle on one of the shafts.

MURRAY LANG.

REFERENCES CITED

The following references are of record in the file of this patent:

UNITED STATES PATENTS

| Number | Name | Date |
|---|---|---|
| 267,534 | Hunter | Nov. 14, 1882 |
| 315,723 | Carter | Apr. 14, 1885 |
| 411,169 | Schmidt | Sept. 17, 1889 |
| 937,322 | McBratney | Oct. 19, 1909 |
| 996,891 | Short | July 4, 1911 |
| 1,976,751 | Short | Oct. 16, 1934 |
| 2,126,554 | Hoy et al. | Aug. 9, 1938 |

FOREIGN PATENTS

| Number | Country | Date |
|---|---|---|
| 627,457 | Germany | Mar. 16, 1936 |